(12) United States Patent
Nishizawa (10) Patent No.: US 8,421,745 B2
(45) Date of Patent: Apr. 16, 2013

(54) METHOD OF DRIVING ELECTRO-OPTICAL DEVICE, ELECTRO-OPTICAL DEVICE, AND CONTROLLER

(75) Inventor: Masato Nishizawa, Shiojiri (JP)

(73) Assignee: Seiko Epson Corporation (JP)

( * ) Notice: Subject to any disclaimer, the term of this patent is extended or adjusted under 35 U.S.C. 154(b) by 164 days.

(21) Appl. No.: 13/026,353

(22) Filed: Feb. 14, 2011

(65) Prior Publication Data

US 2011/0221730 A1 Sep. 15, 2011

(30) Foreign Application Priority Data

Mar. 9, 2010 (JP) ................................ 2010-051890

(51) Int. Cl.
*G09G 3/34* (2006.01)

(52) U.S. Cl.
USPC ............................ 345/107; 345/173; 345/204

(58) Field of Classification Search ............ 345/87–107, 345/173, 204–214; 359/296
See application file for complete search history.

(56) References Cited

U.S. PATENT DOCUMENTS

| | | | |
|---|---|---|---|
| 2006/0187185 A1* | 8/2006 | Yoshinaga et al. ............ | 345/107 |
| 2007/0002008 A1* | 1/2007 | Tam ............................... | 345/107 |
| 2008/0277279 A1 | 11/2008 | Hirayama et al. | |
| 2009/0231267 A1* | 9/2009 | Uchida ........................... | 345/107 |
| 2009/0243996 A1* | 10/2009 | Yamada ......................... | 345/107 |
| 2010/0053230 A1* | 3/2010 | Verschueren .................. | 345/690 |

FOREIGN PATENT DOCUMENTS

JP 2008-180974 8/2008

* cited by examiner

*Primary Examiner* — Amare Mengistu
*Assistant Examiner* — Hong Zhou
(74) *Attorney, Agent, or Firm* — Harness, Dickey & Pierce, P.L.C.

(57) ABSTRACT

A method of driving an electro-optical device including a plurality of pixels, one of which having a first electrode, a second electrode, and an electro-optical material layer, includes: when an image is rewritten, selecting a first display state of the one pixel by applying a first voltage to the first electrode and applying a second voltage to the second electrode, or selecting a second display state of the one pixel by applying a third voltage to the second electrode; and when a part of the image is rewritten, selecting any of the first display state and the second display state of the one pixel by applying a fourth voltage which is different from the first voltage to the first electrode and applying a fifth voltage which has a different polarity from that of the fourth voltage with respect to the first voltage to the second electrode.

11 Claims, 9 Drawing Sheets

FIG. 6A
SQ11
TYPICAL DRIVE
[DIFFERENCE WRITING]

FIG. 6B
SQ12
HIGH-SPEED DRIVE
[LINE WRITING]

FIG. 6C
SQ13
HIGH-SPEED DRIVE
[ERASING]

FIG. 8A
SQ12A
HIGH-SPEED DRIVE
[LINE WRITING]

FIG. 8B
SQ13A
HIGH-SPEED DRIVE
[ERASING]

FIG. 8C

FIG. 9A
SQ12B
HIGH-SPEED DRIVE
[LINE WRITING]

FIG. 9B
SQ13B
HIGH-SPEED DRIVE
[ERASING]

METHOD OF DRIVING ELECTRO-OPTICAL DEVICE, ELECTRO-OPTICAL DEVICE, AND CONTROLLER

BACKGROUND

1. Technical Field

The present invention relates to a method of driving an electro-optical device and an electro-optical device.

2. Related Art

Electronic paper terminals using electrophoretic display devices have been put into practical use. In such types of electronic paper terminals, the speed of display switching typically in units of pages is practical. However, for handwriting input or moving image display, a further increase in the display switching speed is required.

As a method of reducing an image rewriting time in an electrophoretic display device, for example, a driving method disclosed in, for example, JP-A-2008-180974 may be employed. In the driving method, after an image signal is input to each pixel, a periodic rectangular wave is supplied to a common electrode, thereby increasing the contrast. Accordingly, even in a case where the image rewriting time is reduced, it is possible to ensure display quality.

However, the driving method disclosed in JP-A-2008-180974 does not consider a case, such as handwriting, where only a part of a display unit is rewritten. That is, regardless of the size of the region to be rewritten, a time period (1 to 2 seconds) for increasing the contrast by inputting the rectangular wave to the common electrode is needed, so that times taken to update an image by partial rewriting and by entire rewriting are substantially the same.

SUMMARY

An advantage of some aspects of the invention is that it provides a method of driving an electro-optical device capable of performing partial display updating at a high-speed and an electro-optical device.

According to an aspect of the invention, there is provided a method of driving an electro-optical device which has a plurality of pixels and in which one from among the plurality of pixels has a first electrode, a second electrode, and an electro-optical material layer, the method including: when an image displayed by the plurality of pixels is rewritten, selecting a first display state of the one pixel by applying a first voltage to the first electrode and applying a second voltage to the second electrode; selecting a second display state of the one pixel by applying the first voltage to the first electrode and applying a third voltage which has a reverse polarity to that of the second voltage with respect to the first voltage to the second electrode; and when a part of the image is rewritten, selecting any of the first display state and the second display state of the one pixel by applying a fourth voltage which is different from the first voltage to the first electrode and applying a fifth voltage which has a different polarity from that of the fourth voltage with respect to the first voltage to the second electrode.

In the driving method, when the image displayed by the plurality of pixels is rewritten, in the one pixel, the first display state is selected by applying the first voltage to the first electrode and applying the second voltage to the second electrode. In the other pixel, the second display state is selected by applying the first voltage to the first electrode and applying the third voltage which has a reverse polarity to that of the second voltage with respect to the first voltage to the second electrode. Accordingly, the display states of the two pixels can be simultaneously transited to different display states, and consequently, the image can be rewritten at high speed.

In addition, in the case where the display states of some pixels from among the plurality of pixels are changed in order to rewrite a part of the image, the fourth voltage is applied to the first electrode of the pixel as a writing object, and the fifth voltage which has a different polarity from that of the fourth voltage with respect to the first voltage is applied to the second electrode. Accordingly, compared to the case where the image displayed by the plurality of pixels is rewritten, a voltage applied to the electro-optical material layer of the pixel as the rewriting object can be further increased, and consequently, the display state of the pixel can be changed at a higher speed.

It is preferable that the absolute value of a potential difference between the fifth voltage and the fourth voltage be greater than the absolute value of a potential difference between the second voltage and the first voltage and the absolute value of a potential difference between the third voltage and the first voltage.

In this driving method, when a part of the image is rewritten, compared to the case where the image displayed by the plurality of pixels is rewritten, the voltage applied to the electro-optical material layer can be further increased, so that partial display updating can be performed at high speed.

It is preferable that when the part of the image is rewritten, at least one of the fourth voltage and the fifth voltage be changed with a size of a rewritten region.

In a case where the rewritten region is small, inputting of image signals to the plurality of pixels is ended within a short time, so that when the electro-optical material layer which has low responsiveness is used, there may be a case where a display with a desired contrast cannot be obtained. Here, as in the driving method, when the voltage is varied with the size of the rewritten area, the time taken to drive the electro-optical material layer can be ensured even in the case where the region is small, thereby obtaining the display with a desired contrast.

It is preferable that a plurality of scanning lines be further included, and when the part of the image is rewritten, at least one of the fourth voltage and the fifth voltage be changed with the number of scanning lines connected to pixels as rewriting objects.

As such, when the voltage is changed with the number of scanning lines to which selection signals are supplied, setting values of the voltage can be easily acquired during generation of image data for partial driving, so that a display with high image quality can be obtained by the simple driving method.

It is preferable that an input device for inputting coordinates corresponding to the pixel be included, and the number of scanning lines connected to the pixels as the rewriting objects be calculated on the basis of a coordinate value supplied from the input device. In the driving method, the result of the coordinate input using the input device can be reflected on the display at high speed.

According to another aspect of the invention, there is provided an electro-optical device including: a plurality of pixels, from which one pixel has a first electrode, a second electrode, and an electro-optical material layer, wherein, when an image displayed by the plurality of pixels is rewritten, a first display state of a first pixel from among the plurality of pixels is selected by applying a first voltage to the first electrode and applying a second voltage to the second electrode, a second display state of a second pixel from among the plurality of pixels is selected by applying the first voltage to the first electrode and applying a third voltage which has a reverse polarity to that of the second voltage with respect to the first voltage to the second electrode, and when a part of the image is rewritten, a fourth voltage which is different from the first voltage is applied to the first electrode of the pixel driven selectively from the plurality of pixels, and a fifth voltage which has a different polarity from that of the fourth voltage with respect to the first voltage is applied to the second electrode.

In the electro-optical device having the above configuration, when the image displayed by the plurality of pixels is rewritten, in the one pixel, the first display state is selected by applying the first voltage to the first electrode and applying the second voltage to the second electrode. In the other pixel, the second display state is selected by applying the first voltage to the first electrode and applying the third voltage which has a reverse polarity to that of the second voltage with respect to the first voltage to the second electrode. Accordingly, the display states of the two pixels can be simultaneously transited to different display states, and consequently, the image can be rewritten at high speed.

In addition, in the case where the display states of some pixels from among the plurality of pixels are changed in order to rewrite a part of the image, the fourth voltage is applied to the first electrode of the pixel as a writing object, and the fifth voltage which has a different polarity from that of the fourth voltage with respect to the first voltage is applied to the second electrode. Accordingly, compared to the case where the image displayed by the plurality of pixels is rewritten, a voltage applied to the electro-optical material layer of the pixel as the rewriting object can be further increased, and consequently, the display state of the pixel can be changed at a higher speed.

Even in the electro-optical device, it is preferable that the absolute value of a potential difference between the fifth voltage and the fourth voltage be greater than the absolute value of a potential difference between the second voltage and the first voltage and the absolute value of a potential difference between the third voltage and the first voltage.

In addition, it is preferable that when the part of the image is rewritten, at least one of the fourth voltage and the fifth voltage be changed with a size of a rewritten region.

In addition, it is preferable that a plurality of scanning lines connected to the pixels be further included, and when the part of the image is rewritten, at least one of the fourth voltage and the fifth voltage be changed with the number of scanning lines connected to pixels as rewriting objects.

In addition, it is preferable that an input device for inputting coordinates corresponding to the pixel be included, and the number of scanning lines be calculated on the basis of a coordinate value supplied from the input device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, exemplary embodiments of the invention will be described with reference to the accompanying drawings.

Moreover, the scope of the invention is not limited by the following embodiments, and arbitrary modifications can be made without departing from the spirit and scope of the invention. In addition, in the drawings, in order to clarify each configuration, there may be a case where scales, numbers, and the like of each structure are changed from those of the practical structure.

An electro-optical device according to this embodiment is an electronic book reader for reading electronic books or the like made of documents separated into predetermined pages.

Figure 1:
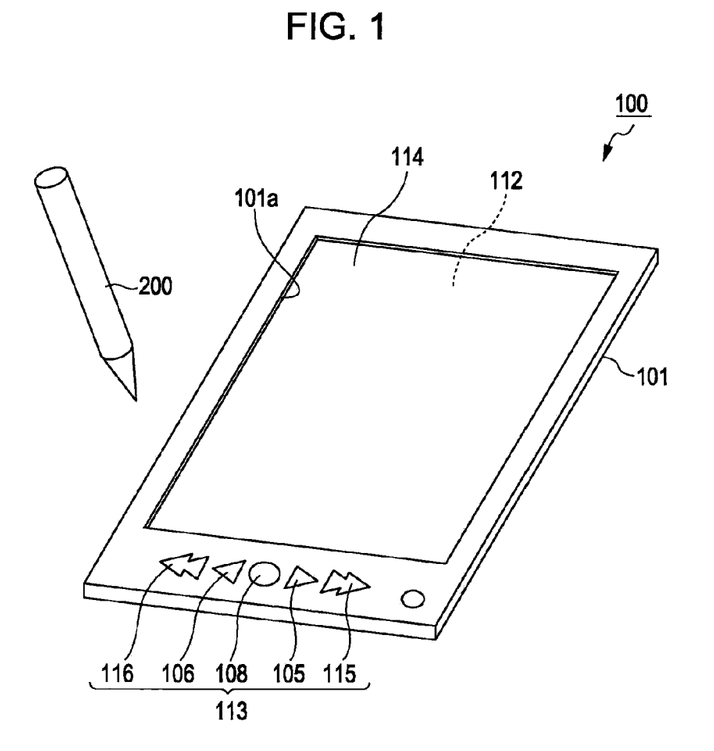
FIG. 1 is a diagram of the outer appearance of an electronic book reader according to an embodiment.
Figure 2:
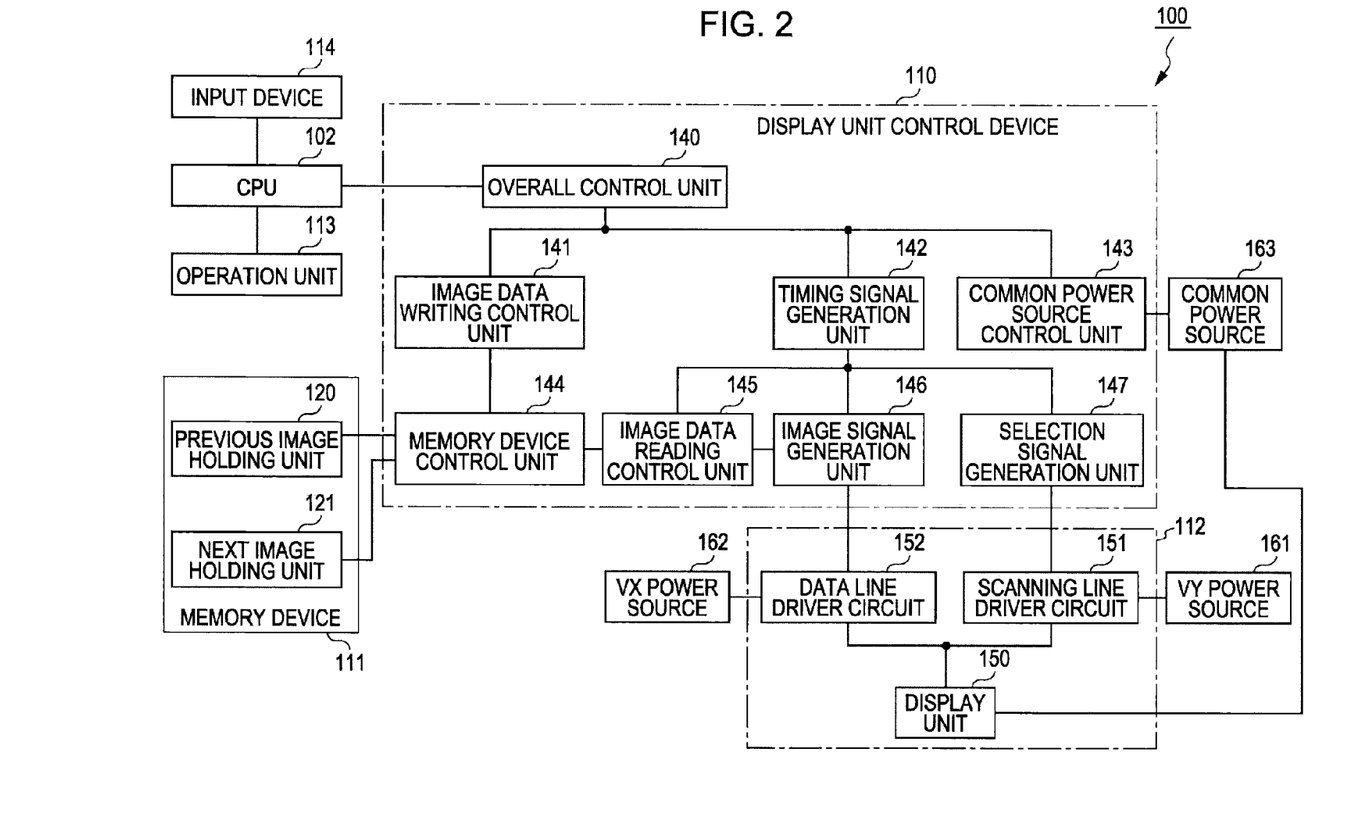
FIG. 2 is a block diagram showing the internal configuration of the electronic book reader according to the embodiment.

FIG. 1 is a diagram of the outer appearance of an electronic book reader 100 according to this embodiment. FIG. 2 is a block diagram showing the internal configuration of the electronic book reader 100 according to this embodiment.

As illustrated in FIG. 1, the electronic book reader 100 includes a housing 101, an input device 144 mounted to a rectangular opening portion 101a formed on one face of the housing 101, and an electro-optical panel 112 disposed at the rear surface of the input device 114. The housing 101 is provided with an operation unit 113 including a page forward button 105, a page back button 106, a determine button 108, a skip forward button 115, and a skip back button 116.

The input device 114 is a coordinate input device capable of inputting coordinates by a sliding operation of a pen 200 (stylus) on the surface. The input device 114 is not particularly limited, and various types can be used.

Specifically, the following types (1) to (4) can be exemplified.

(1) a type of causing the tip of a stylus to directly come in contact with a capacitive array or a resistive array (2) a type of using an electronic digitizer to interact with a stylus having a magnetic tip structure or a stylus having an electromagnetic field generation type when a desired operation is performed as a user inputs data (3) a type of using a stylus having an RF transceiver for transmitting a signal to a digitizing array (4) a type of embedding a visible light source or an infrared light source in the tip of a stylus so as to reflect from an input surface Moreover, in FIG. 1, the input device 114 is disposed on the front surface side of the electro-optical panel 112. However, when the type of the input device 114 is (2), (3), or (1) with the capacitive array, the input device 114 may be disposed on the rear surface side of the electro-optical panel 112.

The page forward button 105 is an operation unit for activating a function of displaying a document (electronic book) which is currently being displayed on the electro-optical panel 112 to move on to the next page, page by page whenever the button is pressed once. The page back button 106 is an operation unit for activating a function of displaying the document to move back to the previous page, page by page whenever the button is pressed once.

The skip forward button 115 is an operation unit for activating a function of displaying the page by skipping, for example, 10 pages forward whenever the button is pressed once. The skip back button 116 is an operation unit for activating a function of displaying the page by skipping, for example, 10 pages back whenever the button is pressed once. The number of pages skipped by the skip forward button 115 and the skip back button 116 may be arbitrarily set.

The electronic book reader 100 includes, as illustrated in FIG. 2, a CPU (Central Processing Unit: control unit) 102, a display unit control device (a controller) 110, a memory device 111, the electro-optical panel 112, the operation unit 113, the input device 114, a VY power source 161, a VX power source 162, and a common power source 163.

Moreover, a work memory or a program memory (not shown) is connected to the CPU 102 illustrated in FIG. 2. The work memory is a RAM (Random Access Memory) in which a work area of the CPU 102 is configured, and the program memory is a ROM (Read Only Memory) in which various programs are held. The work memory or the program memory may be included in the memory device 111, or may be provided as a separate memory device from the memory device 111. Otherwise, the CPU 102 may be configured to include the work memory or the program memory.

The CPU 102 reads various programs such as a basic control program or an application program stored in the program memory and data, develops the various programs and data on the work area provided in the work memory (not shown) to be performed, and controls each components included in the electronic book reader.

The CPU 102 is connected to the display unit control device 110, the operation unit 113, and the input device 114. The electro-optical panel 112 and the common power source 163 are connected to the display unit control device 110, and the VY power source 161 and the VX power source 162 are connected to the electro-optical panel 112.

The operation unit 113 includes the page forward button 105, the page back button 106, the determine button 108, the skip forward button 115, and the skip back button 116 illustrated in FIG. 1, and when any button is operated (pressed), outputs a signal (pulse) corresponding to the pressed button to the CPU 102.

The input device 114 is a device for detecting a position indicated by the pen 200 and outputting coordinates (input coordinate value) of the contact position of the pen 200 to the CPU 102. When the pen 200 is caused to slide on the input surface (the display surface of the electronic book reader 100), the input device 114 continuously outputs the input coordinate values corresponding to a trace of the pen 200. The CPU 102 generates an image corresponding to the trace of the pen 200 on the basis of the input coordinate values supplied from the input device 114 and outputs the generated image to the display unit control device 110.

The display unit control device 110 includes an overall control unit 140, an image data writing control unit 141, a timing signal generation unit 142, a common power source control unit 143, a memory device control unit 144, an image data reading control unit 145, an image signal generation unit 146, and a selection signal generation unit 147.

The image data writing control unit 141, the timing signal generation unit 142, and the common power source control unit 143 are connected to the overall control unit 140. The memory device control unit 144 is connected to the image data writing control unit 141. The image data reading control unit 145, the image signal generation unit 146, and the selection signal generation unit 147 are connected to the timing signal generation unit 142. The common power source 163 is connected to the common power source control unit 143.

The display unit control device 110 is connected to the CPU 102 via the overall control unit 140, is connected to the electro-optical panel 112 via the image signal generation unit 146 and the selection signal generation unit 147, and is connected to the memory device 111 via the memory device control unit 144.

The memory device 111 includes a previous image holding unit 120 and a next image holding unit 121 made from RAM. The previous image holding unit 120 is a memory region holding image data (image data corresponding to an image that is currently being displayed) after being displayed on the electro-optical panel 112, and the next image holding unit 121 is a memory region holding image data (image data corresponding to an updated image) to be displayed on the electro-optical panel 112 from now.

Either of the previous image holding unit 120 and the next image holding unit 121 is connected to the memory device control unit 144 of the display unit control device 110, and the display unit control device 110 reads or writes image data from or in the memory device 111 via the memory device control unit 144.

The electro-optical panel 112 includes a display unit 150 having a memory display element such as an electrophoretic element or a cholesteric liquid crystal element, a scanning line driver circuit 151 connected to the display unit 150, and a data line driver circuit 152. The common power source 163 is connected to the display unit 150. The VY power source 161 and the selection signal generation unit 147 of the display unit control device 110 are connected to the scanning line driver circuit 151. The VX power source 162 and the image signal generation unit 146 of the display unit control device 110 are connected to the data line driver circuit 152.

Figure 3:
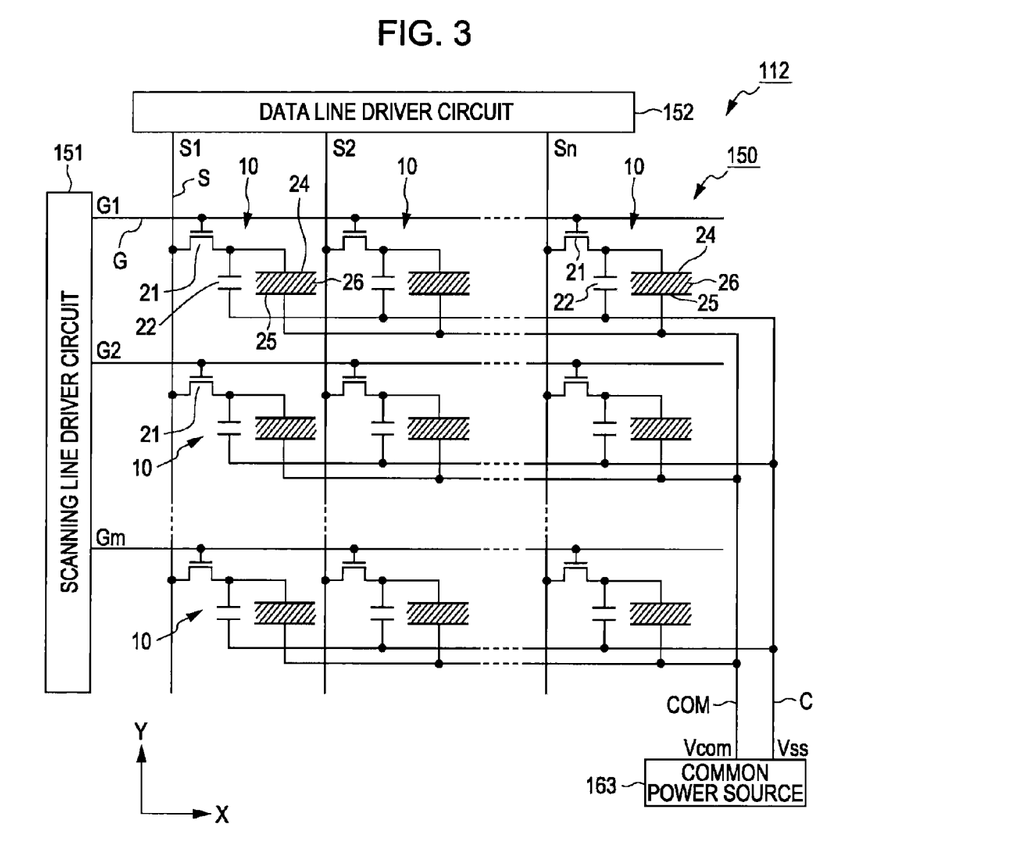
FIG. 3 is a diagram illustrating the electrical configuration of an electro-optical panel.
Figure 4:
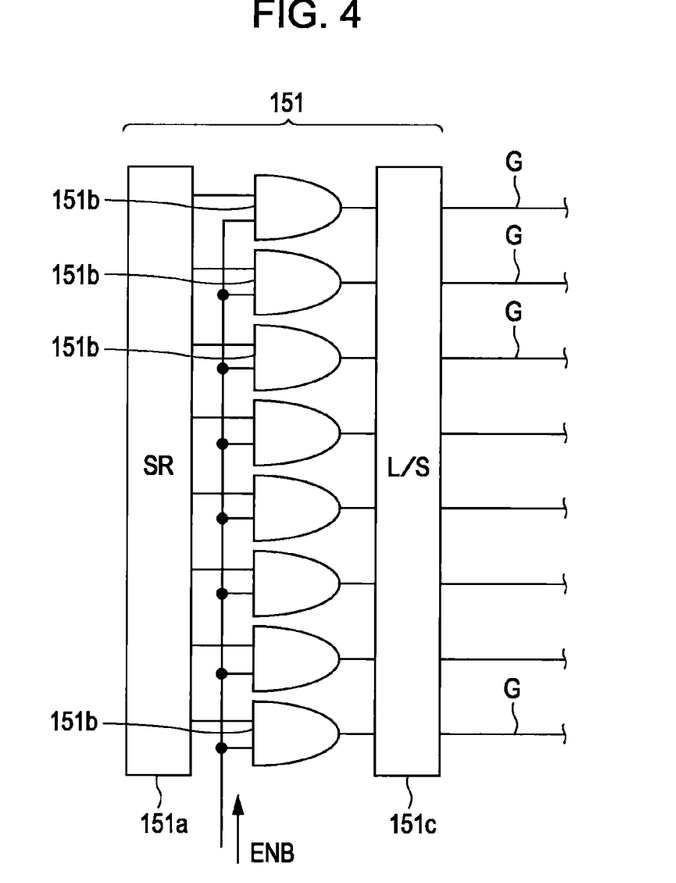
FIG. 4 is a diagram illustrating a configuration example of a scanning line driver circuit.

Here, FIG. 3 is a diagram illustrating the electrical configuration of the electro-optical panel 112, and FIG. 4 is a diagram illustrating a configuration example of the scanning line driver circuit.

In the display unit 150 of the electro-optical panel 112, as illustrated in FIG. 3, a plurality of scanning lines G (G1, G2, . . . , Gm) extending in the illustrated X-axis direction, and a plurality of data lines S (S1, S2, . . . , Sn) extending in the Y-axis direction are formed. Pixels 10 are formed at intersections of the scanning lines G and the data lines S. The pixels 10 are arranged in a matrix form of m rows along the Y-axis direction and n rows along the X-axis direction, and the scanning lines G and the data lines S are connected at each of the pixels 10. In addition, in the display unit 150, common electrode wiring COM and capacitance lines C extending from the common power source 163 are formed.

In the pixel 10, a selection transistor 21 as a pixel switching element, a holding capacitor 22, a pixel electrode 24, a common electrode 25, and an electro-optical material layer 26 are formed.

The selection transistor 21 is configured as an N-MOS (Negative-channel Metal Oxide Semiconductor) TFT. The scanning line G is connected to the gate of the selection transistor 21, the data line S is connected to the source thereof, and the one electrode of the holding capacitor 22 and the pixel electrode 24 are connected to the drain thereof.

The holding capacitor 22 is made of a pair of electrodes opposed with a dielectric film interposed therebetween. The one electrode of the holding capacitor 22 is connected to the drain of the selection transistor 21, and the other electrode thereof is connected to the capacitance line C. An image signal written via the selection transistor 21 can be maintained for a predetermined period by the holding capacitor 22.

The electro-optical material layer 26 is made of an electrophoretic element, a cholesteric liquid crystal element, an electronic powder-particle element, or the like. For example, as the electrophoretic element, electrophoretic particles and dispersion media sealed by microcapsules, electrophoretic particles and dispersion media sealed in a space partitioned by barriers and substrates may be employed.

The scanning line driver circuit 151 is connected to the scanning lines G formed in the display unit 150 and is connected to the pixels 10 of the rows via the corresponding scanning lines G. The scanning line driver circuit 151 sequentially supplies the selection signals in pulse forms to the scanning lines G1, G2, ..., Gm, on the basis of a timing signal supplied from the timing signal generation unit 142 illustrated in FIG. 2 via the selection signal generation unit 147, so as to sequentially cause the scanning lines G to be exclusively in a selected state. The selected state is a state in which the selection transistor 21 connected to the scanning line G is turned on.

In addition, in this embodiment, a function of selecting only a part of the scanning lines G by the scanning line driver circuit 151 is provided. Specifically, as partially illustrated in FIG. 4, the scanning line driver circuit 151 is configured to include a shift register 151a, AND circuits 151b provided to correspond to each of the scanning lines G, and a level shifter 151c. An output signal from each stage of the shift register 151a, and an enable signal ENB supplied from the selection signal generation unit 147 in synchronization with the output signal of the shift register 151a are input to the AND circuit 151b. Only when both the input signals are at high levels, a high-level signal is output from the output terminal of the AND circuit 151b to the level shifter 151c. In this configuration, switching control of the selection signal to be supplied or not to the scanning line G of each row can be performed by an input waveform of the enable signal ENB.

In a case where the selection signals are supplied to the scanning lines G of the $100^{th}$ to $200^{th}$ rows by the scanning line driver circuit 151 having the above configuration, at timings at which the scanning lines G of the $100^{th}$ to $200^{th}$ rows, the high-level enable signals ENB are input to the AND circuits 151b corresponding to the scanning lines G of the $100^{th}$ to $200^{th}$ rows, and the high-level selection signals are input to the scanning lines G via the level shifter 151c from the AND circuits 151b.

To the AND circuits 151b connected to the scanning lines G of the $1^{st}$ to $99^{th}$ rows and after the $201^{st}$ row, the low-level enable signals ENB are input at timings at which the scanning lines G are selected. Accordingly, the output signals from the shift register 151a are blocked by the AND circuits 151b, so that the selection signals are not input to the scanning lines G.

Moreover, the configuration of the scanning line driver circuit 151 is only an example, and other configurations may be employed as long as the configurations selectively input signals to the scanning lines G of arbitrary rows.

The data line driver circuit 152 is connected to the data lines S formed in the display unit 150, and is connected to the pixels 10 of columns via the corresponding data lines S. The data line driver circuit 152 supplies image signals generated by the image signal generation unit 146 to the data lines S1, S2, ..., Sn on the basis of the timing signals supplied via the image signal generation unit 146 from the timing signal generation unit 142.

Moreover, in the following description of operations, the image signal has a binary potential of a high-level potential VH (for example, 15 V) or a low-level potential VL (for example, 0 V or −15 V). In addition, in this embodiment, the high-level image signal VH is supplied to the pixel 10 to be displayed as black (first display state), and the low-level image signal VL is supplied to the pixel to be displayed as white (second display state).

In addition, a potential Vcom is supplied to the common electrode 25 from the common power source 163, and a potential Vss is supplied to the capacitance line C from the common power source 163.

However, in the following description of operations, for simplifying the description, the potential Vcom of the common electrode 25 has a binary potential of a low-level potential VL (for example, 0 V or −15 V) or a high-level potential VH (for example, 15 V). In addition, the potential Vss of the capacitance line C is fixed to a reference potential GND (for example, 0 V).

Moreover, in this embodiment, the electro-optical panel 112 in the active-matrix form having the scanning line driver circuit 151 and the data line driver circuit 152 is exemplified. However, as the electro-optical panel 112, an electro-optical panel in a passive-matrix form or in a segment driving type may be employed. In such types, the pixels 10 as a part of the display unit 150 may be selectively driven to display an image by applying a driving method described later.

Pen Input Display Operation

Next, a pen input display operation in the electronic book reader 100 will be described with reference to the drawings.

The electronic book reader 100 according to this embodiment displays the trace of the pen 200 on the electro-optical panel 112 for the coordinate input by the input device 114 using the pen 200 (line writing operation) or erases image component on the electro-optical panel 112 along the trace of the pen 200 (eraser operation).

Moreover, as an icon or the like displayed on the electro-optical panel 112 is touched by the pen 200, operation modes are switched, or updating, enlarging, or reducing a displayed image can be performed.

Hereinafter, the pen input display operation according to this embodiment will be described in detail with reference to FIGS. 5 to 7B.

Figure 5:
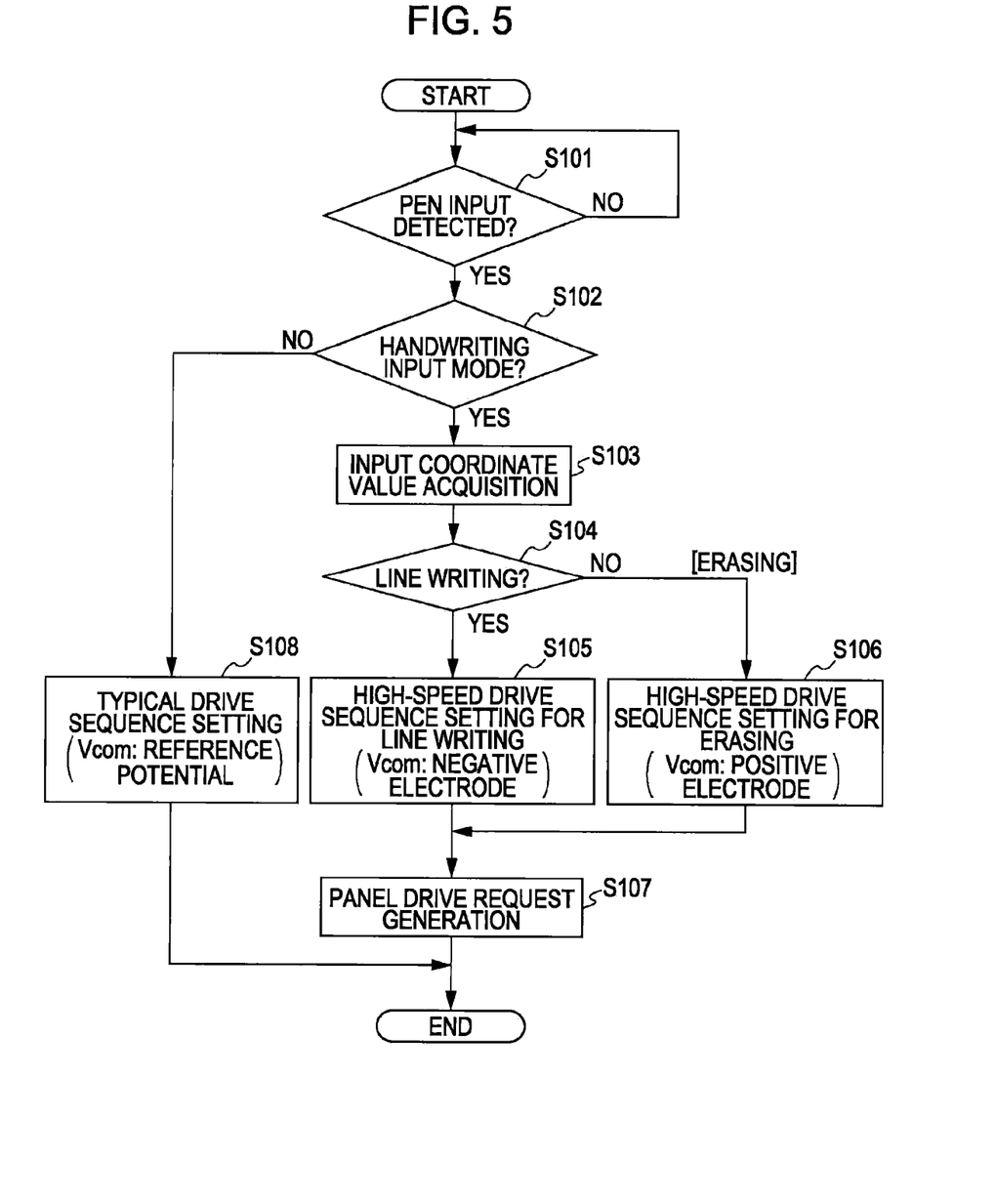
FIG. 5 is a flowchart of a pen input display operation.
Figure 6A:
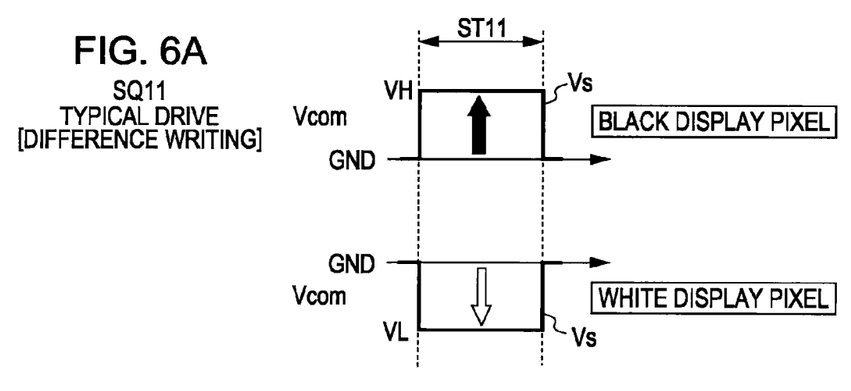
FIGS. 6A to 6C are diagrams illustrating drive waveforms in each operation of drive sequences.
Figure 6B:
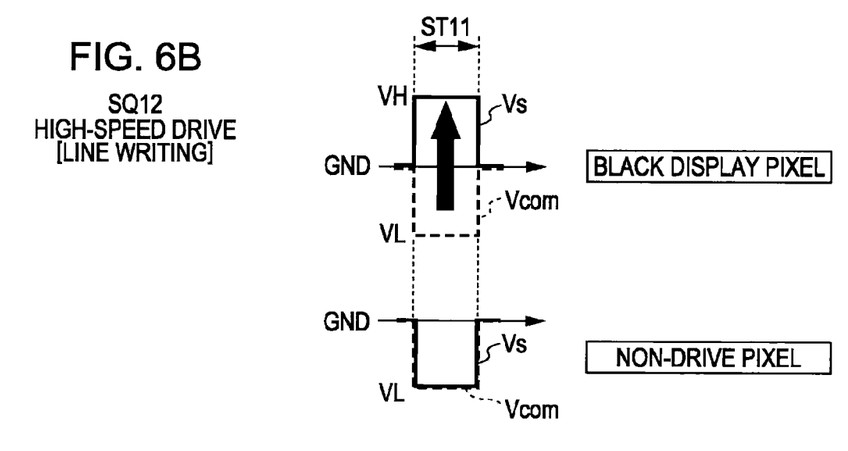
Figure 7A:
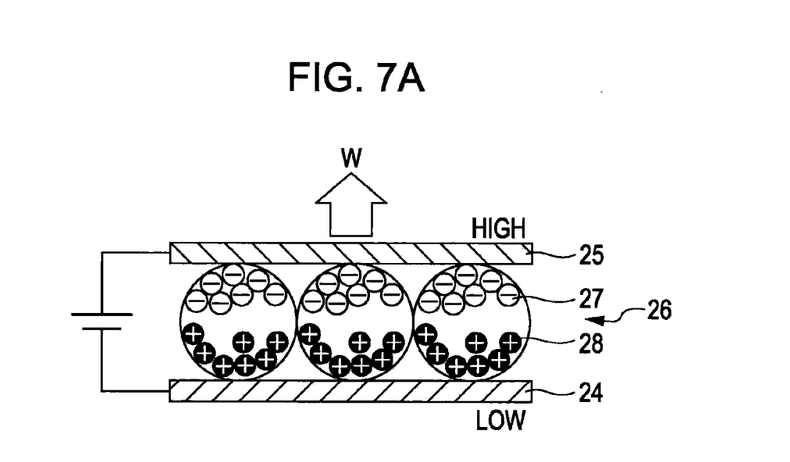
FIGS. 7A and 7B are diagrams illustrating operations of an electrophoretic element.
Figure 7B:
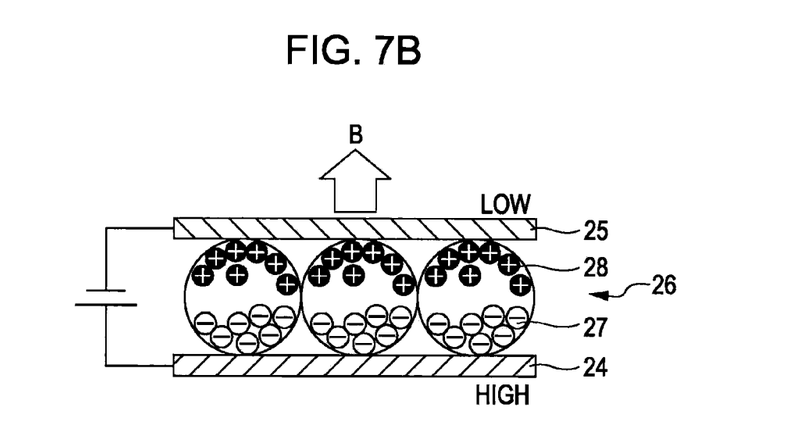

FIG. 5 is a flowchart of the pen input display operation of the electronic book reader 100 according to this embodiment. FIGS. 6A to 6B are diagrams illustrating drive waveforms in each operation of drive sequences. FIGS. 7A and 7B are diagrams illustrating operations of the electrophoretic element.

In this embodiment, for easy understanding of the invention, the electro-optical material layer 26 is described as the electrophoretic element. First, the operations of the electrophoretic element will be described with reference to FIGS. 7A and 7B.

FIG. 7A illustrates a case of displaying a pixel as white, and FIG. 7B illustrates a case of displaying a pixel as black.

In the case of white display illustrated in FIG. 7A, the common electrode 25 is held at a relatively high potential, and the pixel electrode 24 is held at a relatively low potential. Accordingly, white particles 27 negatively charged are pulled toward the common electrode 25, and black particles 28 positively charged are pulled toward the pixel electrode 24. As a result, when the pixel is viewed from the common electrode 25 side which is the display surface side, white (W) is recognized.

In the case of black display illustrated in FIG. 7B, the common electrode 25 is held at a relatively low potential, and the pixel electrode 24 is held at a relatively high potential. Accordingly, the black particles 28 positively charged are pulled toward the common electrode 25, and the white particles 27 negatively charged are pulled toward the pixel electrode 24. As a result, when the pixel is viewed from the common electrode 25 side, black (B) is recognized.

The pen input display operation according to this embodiment includes Steps S101 to S108 shown in FIG. 5. In FIG. 5, a series of operations performed after a coordinate input by the pen 200 is sensed, until an image display operation corresponding to the input is performed is shown.

First, in Step S101, when the CPU 102 detects an input signal from the input device 114, Step S102 is performed, and the pen input display operation is started.

In Step S102, the CPU 102 determines whether or not the electronic book reader 100 is in a handwriting input mode. That is, it is determined whether or not the electronic book reader 100 is in a mode in which the trace of the pen 200, which is caused to slide on the input device 114, is reflected on the image displayed on the electro-optical panel 112. As a result of the determination, when the handwriting input mode is determined, Step S103 is performed. On the other hand, in Step S102, when the handwriting input mode is not determined, Step S108 is performed.

When Step S103 is performed, the CPU 102 acquires input coordinate values output from the input device 114. Thereafter, in Step S104, the CPU 102 determines whether or not the electronic book reader 100 is in a line writing mode. In the specification, the line writing mode means a mode in which letters, straight lines, or the like are written along the trace of the pen 200. When the line writing mode is determined, Step S105 is performed. On the other hand, when the lien writing mode is not determined, that is, in an eraser mode, Step S106 is performed. In the specification, the eraser mode means a mode in which written letters, straight lines, or the like are erased.

Here, Step S108 branched off by the determination result of Step S102, and Steps S105 and S106 branched off by the determination result of Step S104 set drive sequences according to the corresponding operation modes of the electronic book reader 100. Hereinafter, details of each of the drive sequences will be described with reference to Tables 1 and 2 and FIGS. 6A to 6C.

Table 1 is a table showing a correspondence relationship between the operation modes and the drive sequences, and Table 2 is a configuration comparison table of the drive sequences. In addition, in FIGS. 6A to 6C, waveforms input to the pixel electrode 24 and the common electrode 25 in each drive sequence are shown.

TABLE 1

| Mode | Drive Sequence |
|---|---|
| Typical Mode | SQ11 |
| Line Writing Mode | SQ12 |
| Eraser Mode | SQ13 |

TABLE 2

| Drive Sequence | Black Component Writing | White Component Writing | Vs | Vcom |
|---|---|---|---|---|
| SQ11 | ○ | ○ | VH (Black Display Pixel) VL (White Display Pixel) | GND |
| SQ12 | ○ | X | VH | VL |
| SQ13 | X | ○ | VL | VH |

First, Step S108 is performed in a case where the typical mode is determined to be other than the handwriting input mode in Step S102. In Step S108, the CPU 102 sets a typical drive sequence SQ11 for the display unit control device 110.

The typical drive sequence SQ11 is a drive sequence used in a case where image data such as an image file is displayed on the electro-optical panel 112. In the typical drive sequence SQ11, as shown in FIG. 6A and Table 2, in an image display step ST11 of transiting the pixel 10 to a predetermined tone (display state), the common electrode 25 is set to the reference potential GND. In the specification, a potential higher than the potential applied to the common electrode 25 in the typical drive sequence SQ11 is called a positive potential, and a potential lower than the potential applied to the common electrode 25 in the typical drive sequence SQ11 is called a negative potential. In addition, a potential applied to the common electrode 25 in the typical drive sequence SQ11 is called the reference potential GND.

In addition, in the pixel 10 displayed as black, the positive high-level potential VH with respect to the reference potential GND is input to the pixel electrode 24 (potential Vs), and in the pixel 10 displayed as white, the negative low-level potential VL with respect to the reference potential GND is input to the pixel electrode 24. That is, in the typical drive sequence SQ11, when the image is to be rewritten, black display is selected by one pixel 10, and simultaneously, white display is selected by another pixel 10.

Next, in Step S105 performed in the case of the line writing mode, the CPU 102 sets the display unit control device 110 to a high-speed drive sequence SQ12 for line writing. In the high-speed drive sequence SQ12 for line writing, as shown in FIG. 6B and Table 2, the potential Vcom of the common electrode 25 is set to the negative low-level potential VL with respect to the reference potential GND (for example, 0 V). In addition, the high-level potential VH is input to the pixel electrode 24 in the pixel 10 (a pixel for displaying the trace of the pen 200, a black display pixel) displayed as black, and the low-level potential VL (equal to the potential of the common electrode 25) is input to the pixel electrodes 24 in the other pixels 10 (non-drive pixels) which do not change the display.

Accordingly, in the line writing mode, a voltage (VH-VL) applied to the electro-optical material layer 26 (the electrophoretic element) in the pixel 10 for displaying the trace of the pen 200 as black becomes substantially twice the voltage (VH-GND) applied in the typical mode. As a result, compared to the case where the trace of the pen 200 is displayed using the typical drive sequence SQ11, the trace of the pen 200 can be displayed at a higher speed.

Figure 6C:
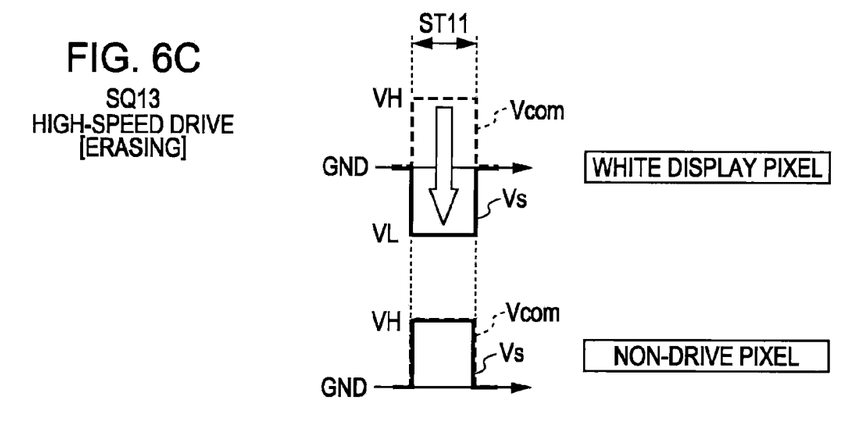

Next, in Step S106 performed in the eraser mode, the CPU 102 sets the display unit control device 110 to a high-speed drive sequence SQ13 for erasing. In the high-speed drive sequence SQ13 for erasing, as shown in FIG. 6C and Table 2, the potential Vcom of the common electrode 25 is set to the positive high-level potential VH with respect to the reference potential GND (for example, 0 V). In addition, the low-level potential VL is input to the pixel electrode 24 in the pixel 10 (a pixel for erasing the display with an eraser, a white display pixel) displayed as white, and the high-level potential VH (equal to the potential of the common electrode 25) is input to the pixel electrodes 24 in the other pixels 10 (non-drive pixels) which do not change the display.

Accordingly, in the eraser mode, the voltage (VH-VL) applied to the electro-optical material layer 26 (the electrophoretic element) in the pixel 10 for displaying the trace of the pen 200 as white becomes substantially twice the voltage (GND-VL) applied in the typical mode. As a result, compared to the case where the image on the trace of the pen 200 is erased using the typical drive sequence SQ11, the image can be erased at a higher speed.

Returning to the flowchart shown in FIG. 5, after the typical drive sequence is set in Step S108, the pen input display operation is ended. That is, when a pen input is received in other than the handwriting input mode, the drive sequence is returned to the typical state such that the process thereof is ended, and the electronic book reader 100 is allowed to perform the other processes (for example, updating, enlarging, and reducing the displayed image, and the like)

In this embodiment, Step S108 is forced to be performed. However, the set state of the current drive sequence may be checked before setting the drive sequence in Step S108, and only when the drive sequence other than the typical drive sequence is set, Step S108 may be performed.

On the other hand, after the high-speed drive sequence SQ12 for line writing or the high-speed drive sequence SQ13 for erasing is set in Step S105 or S106, Step S107 is performed. In Step S107, the CPU 102 generates a panel drive request including image data corresponding to the trace of the pen 200 on the basis of the input coordinate values acquired in Step S103 and outputs the panel drive request to the display unit control device 110.

The display unit control device 110 that receives the panel drive request displays the image data (a line-written region or an erased region) of the trace of the pen 200 included in the panel drive request on the electro-optical panel 112 on the basis of the drive sequence set in step S105 or Step S106. As such, the pen input display operation is completed.

Here, an example of the operation of displaying an image on the electro-optical panel 112 will be described. Hereinafter, a case where the high-speed drive sequence SQ12 for line writing is set for the panel drive request output to the display unit control device 110 is described.

In the example, the overall control unit 140 of the display unit control device 110 outputs the received image data on the trace of the pen 200 to the image data writing control unit 141, and outputs a command for performing the image display step ST11 of the high-speed drive sequence SQ12 for line writing to the timing signal generation unit 142 and the common power source control unit 143.

The image data writing control unit 141 stores the received image data on the trace of the pen 200 in the next image holding unit 121 of the memory device 111 via the memory device control unit 144. Here, image data on pages of the document currently being displayed is held by the previous image holding unit 120.

The timing signal generation unit 142 outputs to the image data reading control unit 145, a command for reading the image data used in the image display step ST11 (image data on the previous image and the next image) from the next image holding unit 121 of the memory device 111. The image data reading control unit 145 acquires the image data on the previous image from the previous image holding unit 120 via the memory device control unit 144, acquires the image data on the next image from the next image holding unit 121, and outputs the image data to the image signal generation unit 146.

The image signal generation unit 146 generates an image signal from difference data between the input image data on the previous image and the image data on the next image, and outputs the generated image signal to the data line driver circuit 152 along with the timing signals.

The selection signal generation unit 147 generates an enable signal ENB needed for displaying the difference data under the control of the timing signal generation unit 142 and outputs the generated enable signal ENB to the scanning line driver circuit 151 along with the timing signals. More specifically, a range of the rows of the scanning lines G included in the pixels 10 for rewriting the display is specified using the difference data calculated by the image signal generation unit 146, and the enable signal ENB is generated to supply the selection signals only to the scanning lines G of the specified region and is supplied to the scanning line driver circuit 151.

The common power source control unit 143 outputs to the common power source 163, a command for supplying the low-level potential VL to the common electrode 25.

In addition, in the electro-optical panel 112, by the scanning line driver circuit 151 to which the enable signal ENB is input and the data line driver circuit 152 to which the image signal is input, the image signal at the high-level potential is input to the pixel electrode 24 of the pixel 10 corresponding to a position designated by the pen 200 in the display unit 150. The low-level potential VL is input to the pixel electrodes 24 of the other pixels 10 which do not change the display. In addition, the low-level potential VL is input to the common electrode 25 from the common power source 163.

Through these operations, the pixel 10 at the position corresponding to the trace of the pen 200 is displayed as black (see FIGS. 6B and 7B), and an image with the overlapping trace of the pen 200 is displayed on the display unit 150 which is displaying the previous image.

Moreover, in the electro-optical panel 112 for driving the electro-optical material layer 26 by the potential of the image signal held in the holding capacitor 22, in the case of the electrophoretic element or the like which has low responsiveness as the electro-optical material layer 26, typically, it is difficult for the holding capacitor 22 to have a capacitance high enough to transit the display state of the electrophoretic element. Accordingly, the image display operation is performed over a plurality of frames on the display unit 150 until the display with a desired contrast can be obtained. That is, the image display steps ST11 shown in FIGS. 6A to 6C are repeated from several times to several tens of times.

In the description of the operations of the electro-optical panel 112, the case where the high-speed drive sequence SQ12 for line writing is set is described. However, in the case where the high-speed sequence SQ13 for erasing is set, the same operations as those of the line writing mode are performed except that the region corresponding to the trace of the pen 200 is displayed as white and the previous image is partially erased.

In the electronic book reader 100 according to this embodiment described above, when a handwriting input is performed via the pen 200, the typical drive sequence SQ11 is switched to the high-speed drive sequence SQ12 for line writing or the high-speed drive sequence SQ13 for erasing.

In addition, in the high-speed drive sequence SQ12 for line writing, a higher voltage than the case of displaying the pixel 10 as black using the typical drive sequence SQ11 is applied to the electro-optical material layer 26 in the pixel 10 displayed as black, the line of the trace of the pen 200 can be displayed at a higher speed than that of the typical mode.

In addition, in the high-speed drive sequence SQ13 for erasing, a higher voltage than the case of displaying the pixel 10 as white using the typical drive sequence SQ11 is applied to the electro-optical material layer 26 in the pixel 10 displayed as white, the image of the part corresponding to the trace of the pen 200 can be erased at a higher speed than that of the typical mode.

As such, according to this embodiment, when an image is partially updated by displaying the trace of the pen 200 or erasing a part corresponding to the trace, the display of the image can be performed at a higher speed. Particularly, in the case where the electrophoretic element with a lower response speed is used, the handwriting input can be performed at high speed, thereby greatly enhancing usability.

Second Embodiment

Hereinafter, a second embodiment will be described with reference to the drawings.

In the second embodiment, the potential Vcom of the common electrode 25 is changed from that of the first embodiment to be variable, and furthermore, the number of writing frames is changed to be variable along with the potential Vcom. Other configurations are the same as those of the above embodiment.

Figure 8A:
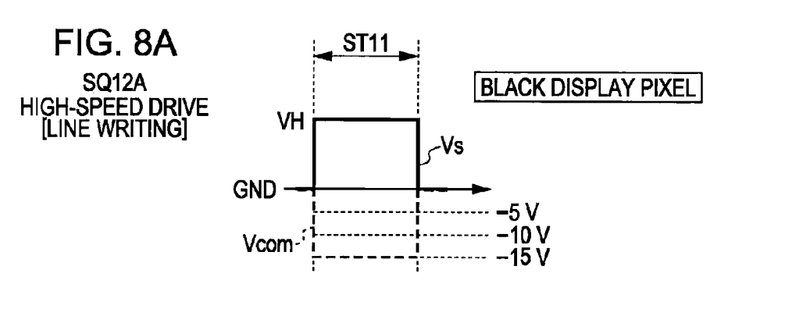
FIGS. 8A to 8C are diagrams illustrating drive waveforms in drive sequences according to a second embodiment.

FIG. 8A is a diagram illustrating a drive waveform in the image display step ST11 of a high-speed drive sequence SQ12A for line writing according to the second embodiment.

Figure 8B:
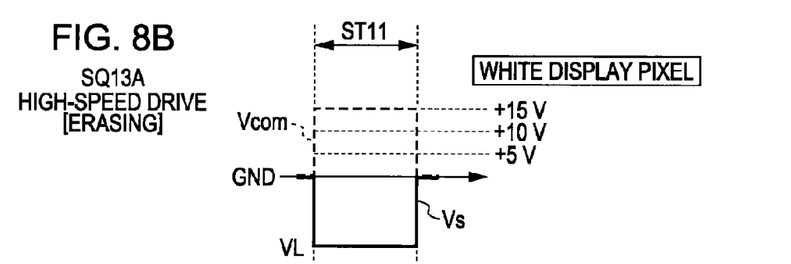

FIG. 8B is a diagram illustrating a drive waveform in the image display step ST11 of a high-speed drive sequence SQ13A for erasing according to the second embodiment.

Figure 8C:
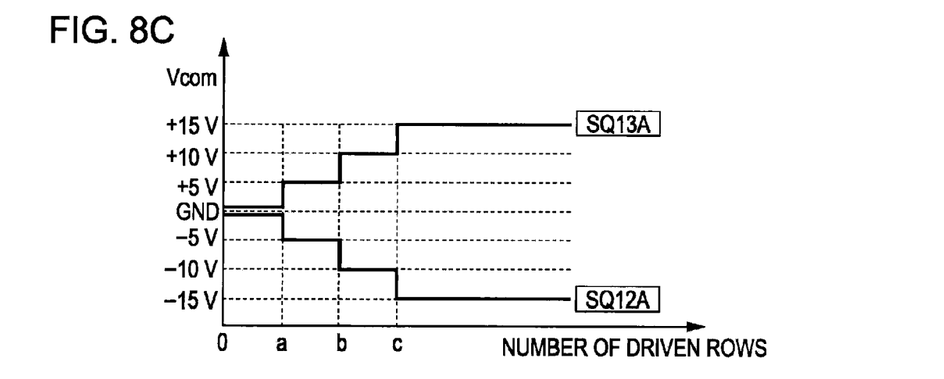

FIG. 8C is a diagram illustrating a method of setting the potential Vcom of the common electrode 25 in the high-speed drive sequence SQ12A for line writing and the high-speed drive sequence SQ13A for erasing.

In the high-speed drive sequence SQ12A for line writing illustrated in FIG. 8A, the potential Vs of the pixel electrode 24 of the black display pixel is fixed to the high-level potential VH in the image display step ST11, and the potential Vcom of the common electrode 25 is able to be selected from among four stages of GND, −5 V, −10 V, and −15 V.

In the high-speed drive sequence SQ13A for erasing illustrated in FIG. 8B, the potential Vs of the pixel electrode 24 of the white display pixel is fixed to the low-level potential VL in the image display step ST11, and the potential Vcom of the common electrode 25 is able to be selected from among four stages of GND, +5 V, +10 V, and +15 V.

Moreover, the drive waveform in the typical mode is the same as that of the typical drive sequence SQ11 illustrated in FIG. 5A.

In addition, in the driving method of this example, as illustrated in FIG. 8C, the potential Vcom of the common electrode 25 is changed in stages with the number of driven scanning lines from among the scanning lines G.

More specifically, in a case where the number of driven rows is equal to or greater than 1 and equal to or smaller than a (a is a natural number equal to or greater than 1), the potential Vcom in both the high-speed drive sequence SQ12A for line writing and the high-speed drive sequence SQ13A for erasing is set to the reference potential GND.

In a case where the number of driven rows is greater than a and equal to or smaller than b (b is a natural number greater than a), the potential Vcom is set to −5 V in the high-speed drive sequence SQ12A for line writing and is set to +5 V in the high-speed drive sequence SQ13A for erasing.

In a case where the number of driven rows is greater than b and equal to or smaller than c (c is a natural number greater than b), the potential Vcom is set to −10 V in the high-speed drive sequence SQ12A for line writing and is set to +10 V in the high-speed drive sequence SQ13A for erasing.

In a case where the number of driven rows is greater than c, the potential Vcom is set to −15 V in the high-speed drive sequence SQ12A for line writing and is set to +15 V in the high-speed drive sequence SQ13A for erasing.

As such, as the number of driven scanning lines is increased, the voltage applied to the electro-optical material layer 26 is increased.

As described above, in the electronic book reader 100, when the trace of the pen 200 is reflected on the display, only the pixels 10 which are a part of the display unit 150 are driven. In this partial driving, in the shift register 151a, an operation clock of a region corresponding to the scanning lines G to which the selection signals are not input can be increased, so that the time taken to select the scanning lines G connected to the driven pixels 10 can be reduced, thereby displaying the trace of the pen 200 at high speed.

On the other hand, in a case where the trace of the pen 200 is short and thus the number of driven rows is extremely small, one frame period is ended within an extremely short time. In this case, the time taken to drive the electro-optical material layer 26 by energy stored in the holding capacitor 22 is reduced, so that a sufficient contrast cannot be obtained by the same number of writing frames as that of the typical mode. This phenomenon significantly occurs in the case where the electro-optical material layer 26 is an electrophoretic element with low responsiveness.

Therefore, in this example, in the case where the number of driven rows is small as described above, as illustrated in FIG. 8C, the potential Vcom of the common electrode 25 is changed to reduce the voltage applied to the electro-optical material layer 26. In addition, here, while the voltage applied to the electro-optical material layer 26 is reduced, a writing time of the pixel 10 is increased. Accordingly, the time taken to drive the electro-optical material layer 26 by the holding capacitor 22 is increased while the amount of energy stored in the holding capacitor 22 is maintained, so that even the electro-optical material layer 26 with low responsiveness can obtain a sufficient contrast.

In addition, by reducing a difference between the potential Vcom of the common electrode 25 and the reference potential GND, power consumption caused by changing the potential of the common electrode 25 can be reduced.

Moreover, in the case where the number of driven rows is extremely small, although the time taken to apply the voltage for one selection period is increased, there may not be enough time for the electro-optical material layer 26 to sufficiently respond. In this case, the number of writing frames may be increased to ensure the drive time.

Third Embodiment

Figure 9A:
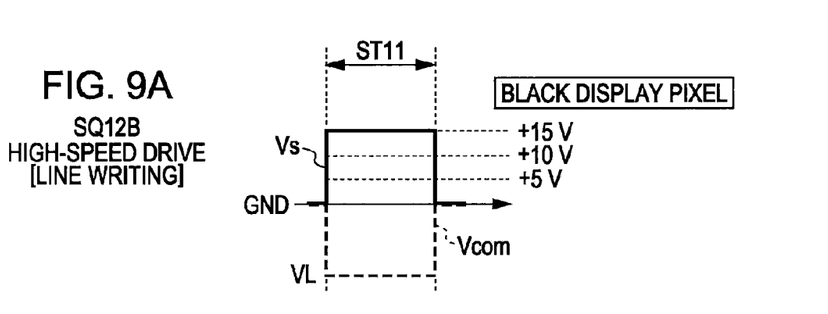
FIGS. 9A and 9B are diagrams illustrating drive waveforms in drive sequences according to a third embodiment.
Figure 9B:
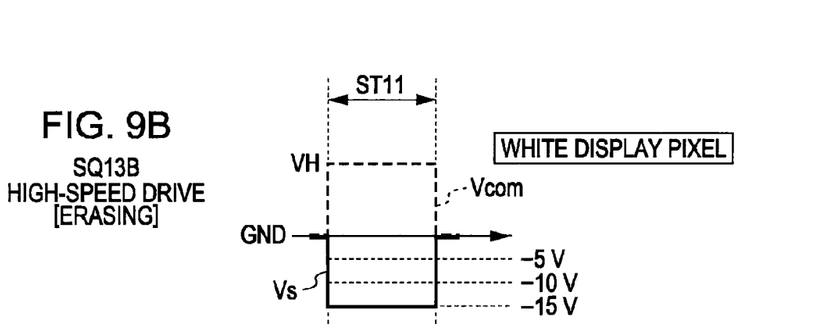

In the second embodiment, the case where the potential Vcom of the common electrode 25 is variable is described. However, as illustrated in FIGS. 9A and 9B, the voltage applied to the electro-optical material layer 26 may be adjusted by the potential Vs of the pixel electrode 24. This configuration will now be described as a third embodiment.

In a high-speed drive sequence SQ12B for line writing illustrated in FIG. 9A, in the image display step ST11, the potential Vcom of the common electrode 25 of the black display pixel is fixed to the low-level potential VL, and the potential Vs of the pixel electrode 24 is able to be selected from among four stages of GND, +5 V, +10 V, and +15 V.

In a high-speed drive sequence SQ13B for erasing illustrated in FIG. 9B, in the image display step ST11, the potential Vcom of the common electrode 25 of the white display pixel is fixed to the high-level potential VH, and the potential Vs of the pixel electrode 24 is able to be selected from among four stages of GND, −5 V, −10 V, and −15 V.

As illustrated in FIGS. 9A and 9B, even in the case where the potential Vs of the pixel electrode 24 can be changed, as in the second embodiment, it is possible to increase the voltage applied to the electro-optical material layer 26 as the number of driven scanning lines is increased. Therefore, the potential Vs can be changed with the number of driven rows acquired from the difference data, so that in a case where the number of driven scanning lines G is small and a high-speed display is not required, the amplitude of the voltage of the data line S is reduced to reduce the power consumption.

In addition, the driving method of the third embodiment is a simpler driving method than that of the second embodiment since the potential Vcom of the common electrode 25 is fixed and does not need to be changed whenever the number of driven rows is changed.

More specifically, in the driving method of the second embodiment, the pixel electrode 24 of the pixel 10 which does not change the display has to have the same potential as the potential Vcom, so that the potential applied to the pixel electrode 24 needs to be changed as the potential of the common electrode 25 is changed.

Contrary to this, in the third embodiment, only the potential Vs input to the pixel electrode 24 of the pixel 10 corresponding to the trace of the pen 200 is changed with the number of driven rows, and the voltage applied to the pixel electrode 24 of the pixel 10 which does not change the display is not changed, so that voltage control of each electrode can be relatively easily performed.

Moreover, in the above embodiments, the partial driving used for reflecting the trace of the pen 200 on the display of the electro-optical panel 112 is described. However, the spirit and scope of the invention are not limited to handwriting input, and the driving method of the electro-optical device according to the invention can be applied any partial display updating of the electro-optical panel 112 without any problems. For example, the invention can be very suitably used in a case where display and non-display of a window displayed at a part of the display unit 150 are switched, a case were a moving image is displayed in a window, and the like.

The entire disclosure of Japanese Patent Application No. 2010-051890, filed Mar. 9, 2010 is expressly incorporated by reference herein.

What is claimed is:

1. A method of driving an electro-optical device including a plurality of pixels, one of the plurality of pixels having a first electrode, a second electrode opposed to the first electrode, and an electro-optical material layer disposed between the first electrode and the second electrode, a state of the electro-optical material layer changing when an electric field is applied between the first electrode and the second electrode, the method comprising:
when an image displayed by the plurality of pixels is rewritten,
selecting a first display state of the one pixel by applying a first voltage to the first electrode and applying a second voltage to the second electrode, or selecting a second display state of the one pixel by applying the first voltage to the first electrode and applying a third voltage which has a reverse polarity to that of the second voltage with respect to the first voltage to the second electrode; and
when a part of the image is rewritten,
selecting any of the first display state and the second display state of the one pixel by applying a fourth voltage which is different from the first voltage to the first electrode and applying a fifth voltage which has a different polarity from that of the fourth voltage with respect to the first voltage to the second electrode.

2. The method according to claim 1, wherein an absolute value of a potential difference between the fifth voltage and the fourth voltage is greater than an absolute value of a potential difference between the second voltage and the first voltage and an absolute value of a potential difference between the third voltage and the first voltage.

3. The method according to claim 1, wherein, when the part of the image is rewritten, at least one of the fourth voltage and the fifth voltage is changed with a size of a rewritten region.

4. The method according to claim 3, further comprising a plurality of scanning lines,
wherein, when the part of the image is rewritten, at least one of the fourth voltage and the fifth voltage is changed with the number of scanning lines connected to pixels as rewriting objects.

5. The method according to claim 4,
wherein an input device for inputting coordinates corresponding to the pixel is included, and
the number of scanning lines connected to the pixels as the rewriting objects is calculated on the basis of a coordinate value supplied from the input device.

6. An electro-optical device comprising:
a plurality of pixels, one of the plurality of pixels having a first electrode, a second electrode opposed to the first electrode, and an electro-optical material layer disposed between the first electrode and the second electrode, a state of the electro-optical material layer changing when an electric field is applied between the first electrode and the second electrode,
wherein, when an image displayed by the plurality of pixels is rewritten,
a first display state of the one pixel is selected by applying a first voltage to the first electrode and applying a second voltage to the second electrode, or a second display state of the one pixel is selected by applying the first voltage to the first electrode and applying a third voltage which has a reverse polarity to that of the second voltage with respect to the first voltage to the second electrode, and
when a part of the image is rewritten,
a fourth voltage which is different from the first voltage is applied to the first electrode of the one pixel driven selectively from the plurality of pixels, and a fifth voltage which has a different polarity from that of the fourth voltage with respect to the first voltage is applied to the second electrode.

7. A controller for controlling an electro-optical device including a plurality of pixels, one of the plurality of pixels having a first electrode, a second electrode opposed to the first electrode, and an electro-optical material layer disposed between the first electrode and the second electrode, a state of the electro-optical material layer changing when an electric field is applied between the first electrode and the second electrode, the controller executing a driving method comprising:
when an image displayed by the plurality of pixels is rewritten,
selecting a first display state of the one pixel by applying a first voltage to the first electrode and applying a second voltage to the second electrode, or selecting a second display state of the one pixel by applying the first voltage to the first electrode and applying a third voltage which has a reverse polarity to that of the second voltage with respect to the first voltage to the second electrode; and
when a part of the image is rewritten,
selecting any of the first display state and the second display state of the one pixel by applying a fourth voltage which is different from the first voltage to the first electrode and applying a fifth voltage which has a different polarity from that of the fourth voltage with respect to the first voltage to the second electrode.

8. The controller according to claim 7, wherein an absolute value of a potential difference between the fifth voltage and the fourth voltage is greater than an absolute value of a potential difference between the second voltage and the first voltage and an absolute value of a potential difference between the third voltage and the first voltage.

9. The controller according to claim 7, wherein, when the part of the image is rewritten, at least one of the fourth voltage and the fifth voltage is changed with a size of a rewritten region.

10. The controller according to claim 9, further comprising a plurality of scanning lines,
 wherein, when the part of the image is rewritten, at least one of the fourth voltage and the fifth voltage is changed with the number of scanning lines connected to pixels as rewriting objects.

11. The controller according to claim 10,
 wherein an input device for inputting coordinates corresponding to the pixel is included, and
 the number of scanning lines connected to the pixels as the rewriting objects is calculated on the basis of a coordinate value supplied from the input device.

\* \* \* \* \*